G. C. LA MOUNTAIN.
STEAM TRAP.
APPLICATION FILED JUNE 26, 1911.

1,028,744.

Patented June 4, 1912.

Witnesses:
W. A. Loftus
A. G. Hague

Inventor.
George C. La Mountain
by J. Ralph Druwig Atty.

UNITED STATES PATENT OFFICE.

GEORGE C. LA MOUNTAIN, OF MARSHALLTOWN, IOWA, ASSIGNOR TO RAY P. SCOTT, OF MARSHALLTOWN, IOWA.

STEAM-TRAP.

1,028,744.

Specification of Letters Patent.

Patented June 4, 1912.

Application filed June 26, 1911. Serial No. 635,399.

*To all whom it may concern:*

Be it known that I, GEORGE C. LA MOUNTAIN, a citizen of the United States, residing at Marshalltown, in the county of Marshall and State of Iowa, have invented a certain new and useful Steam-Trap, of which the following is a specification.

My invention relates to that class of steam traps in which the contraction and expansion of some volatile fluid in a thin metal receptacle is utilized for controlling a valve which regulates the outward flow of water formed by the condensation of steam.

The object of my invention is to provide a new and improved form of steam trap, in which the outlet is closed when the trap is filled with hot steam and provided with simple and effective mechanism by which the outlet is automatically opened when the steam cools and condenses, for permitting the water to flow out of the trap.

More particularly it is my object to provide a steam trap having a hollow metal disk, the expansion and contraction of which automatically controls an outlet valve of the trap, which disk is spirally corrugated so that the strain of expansion and contraction is spread over as much of said disk as possible.

A further object of my invention is to provide suitable mechanism of simple construction whereby vertical movement of said disk imparts rotary motion to the valve, thereby controlling the discharge of water or the like interior of the trap.

A further object of my invention is to provide improved means for supporting said disk in said trap so that the top of the trap may be removed without interfering with the disk.

A further object is to provide such a steam trap, of durable and inexpensive construction, arranged in compact form so that it is adapted for use in a small space.

A further object is to provide such a trap composed of parts fitted together and arranged in such a way that they may be readily and easily taken apart for cleaning.

My invention consists in certain details in the construction, arrangement, and combination of the various parts of the device, whereby the objects contemplated are attained, as hereinafter set forth, pointed out in my claims and illustrated in the accompanying drawings, in which—

Figure 1:
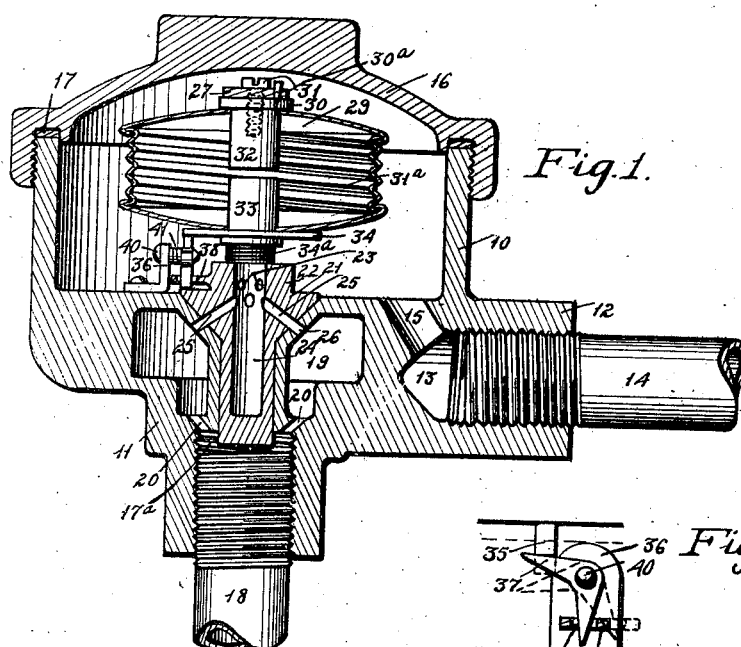
Figure 3:
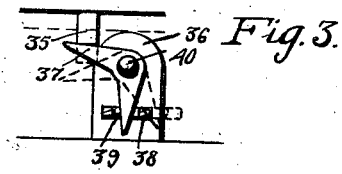
Figure 2:
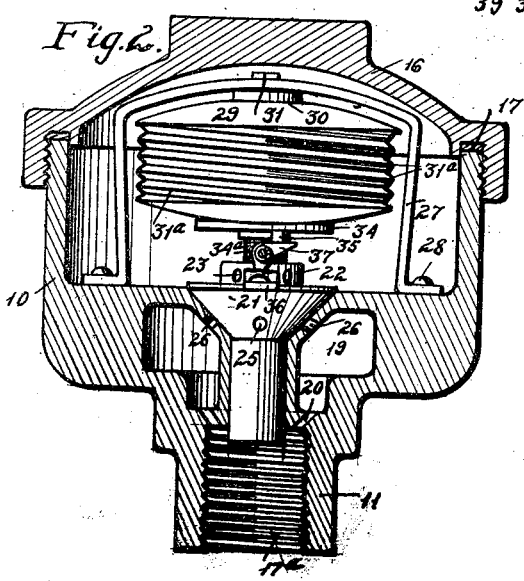

Figure 1 shows a vertical, central, sectional view through a steam trap embodying my invention. Fig. 2 shows a similar view of the same taken on a line at right angles with the view shown in Fig. 1. Fig. 3 shows a detail view of the bell crank lever which rotates the valve.

In the accompanying drawings, I have used the reference numeral 10 to indicate the casing or body portion of the steam trap. The casing or body portion 10 is provided with a downward extension 11 and a right angled extension 12 preferably located near the lower part of the casing 10. The extension 12 is provided with a cylindrical, horizontal screw threaded opening 13 in which is received a screw threaded inlet pipe 14 through which steam is forced into the casing. The opening 13 communicates with the interior of the casing 10 by means of a smaller opening 15. The trap is provided with a detachable screw threaded top 16 of substantially conical shape. A rubber gasket 17 or other suitable packing material is placed between the cap 16 and the casing 10. In the lower portion of the downward extension 11 is formed a cylindrical screw threaded opening 17a in which is received a screw threaded outlet or discharge pipe 18, for carrying off the water of condensation. Extending upwardly from the upper end of the opening 17a is a smaller cylindrical opening communicating with the interior of the casing, which at its upper end is enlarged in the form of an inverted truncated cone, and which forms a valve seat. In the lower part of the casing and surrounding the valve seat, but not communicating with the interior thereof except in a manner hereinafter described, is an annular core or opening 19. Small passage ways 20 connect the opening 19 with the opening 17a.

Seated in the valve seat heretofore mentioned is a valve 21, the lower part of which is cylindrical in shape and the upper part of which is constructed in the form of an inverted truncated cone to fit the valve seat. On the valve is an upward extension 22 on which is a centrally located upwardly extending lug, not shown in the drawings.

The valve is provided with a vertical, cylindrical opening 24 extending from its upper end to a point spaced apart from its lower end. Openings 23 are provided in the valve communicating with the opening 24 and with the interior of the casing 10. The valve is also provided with openings 25 which in one position of the rotation of the valve register with openings 26 in the valve seat thereby connecting the interior of the valve seat with the annular opening 19. In other positions of the rotary movement of the valve, the openings 25 do not register with the openings 26, and all communication between the opening 24 and the opening 19 then shut off.

Mounted on the lower portion of the interior of the casing 10 is a bracket or support 27 which is of any suitable shape, being shown here in the form of an inverted U, detachably secured to the casing 10 by means of bolts 28 or other suitable fastenings. The bracket 27 is of sufficient size and strength and is of proper shape to support the disk which will now be described.

A hollow disk 29 is located within the casing 10 in horizontal position, and is secured at its upper end by means of a plate 30 and the screw 31 to the bracket 27. The disk 29 is preferably composed of thin bronze or copper formed with spiral corrugations 31ª of which there are approximately six to the inch. The upper and lower portions of the disk 29 are formed of smooth metal plates which are rounded respectively upwardly and downwardly. A dowel pin 30ª in the bracket 27 and the plate 30 prevents rotary motion of the latter with reference to the former. The disk 29 is partially filled with some volatile liquid such as mercury, alcohol or ammonia, which expands and contracts readily when subjected to heat or cold. Secured to the plate 30 and the bracket 27 by means of the screw 31 is a vertical limiting block 32 extending to a point near the middle of the disk 29. Mounted in the lower end of the disk 29 is a similar block 33 on the lower end of which, below the disk 29, is a plate 34 on which the disk 33 rests and which serves to support the disk. When the disk is expanded the inner ends of the blocks 32 and 33 are spaced apart from each other and when the disk is contracted the inner ends of said blocks engage each other and prevent the further collapse of the disk. The plate 34 is supported by a coil spring 34ª mounted on the upwardly extending lug, not shown, on the upward extension 22 of the valve, which lug does not reach to the plate 34 and therefore does not interfere with the vertical movement of the disk 29.

Vertical movement of the disk 29, imparts rotary motion to the valve 21 by means of the following simple mechanism. Near the periphery of the plate 34 is a downwardly extending lug 35. At a suitable point on the lower part of the casing 10 on the interior thereof is detachably secured a bracket 36 in which is rotatably mounted a bolt 40. On the end of the bolt 40 is mounted a bell crank lever 37, one arm of which is normally adjacent to the lower end of the lug 35. Extending laterally from the upward extension 22 of the valve, is an arm 38 in which is formed a slot 39. (See Fig. 3.) The other arm of the bell crank lever 37 is received in the slot 39. Mounted on the bolt 40 between the bell crank lever and said bracket 36 and secured to said bell crank lever and said bracket is a coil spring 41, which normally holds the bell crank lever in such position that the valve is held closed.

In the practical operation of my improved steam trap, steam is received into the interior of the casing 10 through the pipe 14 and the openings 13 and 15. The liquid in the disk 29 is very sensitive to heat and cold. The heat of the steam within the trap expands the liquid which in turn expands the disk 29. The expansion of the disk 29 moves downwardly that arm of the bell crank 37 which is engaged by the lug 35, and thus moves the arm 38 in which is received the other arm of said bell crank lever, and thus rotary motion is imparted to the valve 21. The spring 41 is so arranged and the openings 45 are so located that when the disk 29 is contracted, the valve 21 is held in such a position of its rotation, that the openings 25 then register with the openings 26. The expansion of the disk 29 and the consequent movement of the bell crank lever rotates the valve 21 until the openings 25 no longer register with the openings 26, and no communication is left between the interior of the trap and the outlet therefrom. When the steam within the trap cools and condenses, the disk 29 contracts, and the spring 41 moves the bell crank lever 27 in the opposite direction thus rotating the valve 21 and bringing the openings 25 to a position where they register with the openings 26. The water of condensation may then flow from the interior of the trap through the openings 23, into the opening 24, and from the opening 24 through the openings 25 and 26 into the annular opening 19 and from thence through the openings 20 into the discharge pipe 18. The outlet valve 21 is thus automatically regulated by the alternate expansion and contraction of the disk 29. The expansion and contraction of the disk 29 is regulated by the degree of heat or cold within the interior of the casing 10.

My device has the advantage of automatically controlling the valve which permits the discharge of the water of condensation, by simple, inexpensive and efficient means. The cover 16 may be readily taken off the casing for inspecting or repairing the parts. The use of the bracket 27, which is independent of the cover, makes this possible and furnishes a great improvement over the ordinary steam trap. The form of the bracket may be varied, the essential feature thereof being its independence of the cover.

Another advantage is found in the spiral corrugations of the disk 29. The circumferential corrugations permit the ready expansion and contraction of the disk, and, while it is believed that the circumferentially corrugated disk offers an improvement over the disks commonly used, that form has the disadvantage that the weakest corrugation will receive the greatest wear and strain as the disk contracts and expands. When the corrugations run spirally as here shown, this difficulty is avoided and the strain and wear is spread over the whole length of the spiral, greatly increasing the strength and wearing qualities of the disk. The limiting blocks 32 and 33 also decrease the wear on the disk and thus increase its longevity.

The simple mechanism by which vertical movement of the disk imparts rotary movement to the valve is believed to be an improvement over means now employed for that purpose. The parts are few and are not complicated. They are all strong and not likely to get out of order. The parts are readily detachable and may be easily taken apart for repairing or cleaning and are not difficult to reassemble.

I claim as my invention:

1. In a device of the class described, a steam tight casing with an inlet opening, a valve seat in the lower part of said casing provided with outlet openings, a valve seated in said valve seat, a hollow circumferentially corrugated disk composed of thin metal mounted in said casing, a limiting block centrally mounted in the upper end of said disk and extending to a point near the middle thereof, a similar limiting block centrally mounted in the lower end of said disk and extending to a point near the middle thereof, said blocks being of such length that when the disk is expanded by heat, they do not touch each other, but when the disk is contracted the upper block rests upon the lower block and prevents the collapse of the disk, yielding means for holding said valve in its open position, means whereby the expansion of said disk closes said valve.

2. In a device of the class described, a steam tight casing provided with an inlet opening and provided at its lower side with an outlet opening, a detachable cover on said casing, a valve seat provided with openings communicating with said outlet opening, a valve in said valve seat, a bracket mounted in the interior of said casings, independent of said cover, a circumferentially spirally corrugated hollow metal disk, designed to contain a volatile liquid, mounted on said bracket, means whereby yielding pressure is imparted to said valve to hold it normally in its open position, and means whereby the longitudinal expansion of said disk closes said valve, means for holding said disk against rotary motion.

3. In a device of the class described, a steam tight casing provided with an inlet opening, a valve seat in the lower part of said casing provided with outlet openings, the upper portion of said valve seat being constructed in the form of an inverted truncated cone, a hollow circumferentially corrugated disk composed of thin metal mounted within said casing, a valve seated in and fitting said valve seat, said valve being provided with a cylindrical opening extending from its lower end and with openings connecting said cylindrical opening with the interior of said casing, and also with openings which communicate with said cylindrical opening and in one position of the rotation of said valve register with the outlet openings in the valve seat, yielding means whereby said valve is held in said valve seat, yielding means whereby said valve is normally held in such position that the last mentioned openings therein register with said outlet openings, and means whereby the expansion of said disk rotates said valve to a position where the last mentioned openings therein do not register with said outlet openings.

4. In a device of the class described, a steam tight casing provided with an inlet opening, a valve seat in the lower part of said casing provided with outlet openings, the upper portion of said valve seat being constructed in the form of an inverted truncated cone, a hollow circumferentially corrugated disk, designed to contain a volatile liquid, composed of thin metal, mounted within said casing, a valve seated in and fitting said valve seat, said valve being provided with a cylindrical opening extending from its upper end to a point spaced apart from its lower end and with openings connecting said cylindrical opening with the interior of said casing, and also with openings which in one position of the rotation of said valve register with the outlet openings in the valve seat, yielding means whereby said valve is held in said valve seat, yielding means whereby said valve is normally held in such position that the last mentioned openings therein register with said outlet openings, means whereby the expansion of said disk rotates said valve to a position where the last mentioned openings do not register with said outlet openings, said means comprising a plate secured to the lower part of said disk, a downwardly extending lug on said plate, a pivotally mounted bell crank lever, one arm of which is designed to coact with said lug, a laterally extending arm on the upper end of said valve provided with a slot in which is received the other arm of said bell crank lever, said parts being so constructed and arranged that the expansion of said disk rotates said valve until the last mentioned openings therein do not register with the outlet openings in the valve seat.

5. In a device of the class described, a casing provided with an inlet opening, a valve seat therein provided with outlet openings, said valve seat being constructed with a vertical cylindrical opening terminating at its upper end in an opening which is in the shape of an inverted truncated cone, a valve seated in and fitting said valve seat, said valve being provided with a cylindrical opening extending from its upper end to a point spaced apart from its lower end and with openings connecting said cylindrical openings with the interior of said casing, and also with openings which communicate with said cylindrical opening and in one position of the rotation of said valve register with the outlet openings in the valve seat, a hollow circumferentially corrugated disk composed of thin metal mounted in said casing, means whereby the expansion of said disk rotates said valve to a position where the last mentioned openings therein do not register with said outlet openings, said means comprising a plate secured to the lower part of said disk, a downwardly extending lug on said plate, a bracket, a bolt rotatably mounted in said bracket, a bell crank lever mounted on said bolt, one arm of which is designed to coact with said lug, a laterally extending arm on the upper end of said valve provided with a slot in which is received the other arm of said bell crank lever, and means whereby yielding pressure is exerted to hold said valve normally in its open position, said means comprising a coil spring mounted on said bolt and secured to said bracket and said bell crank lever.

6. In a device of the class described, a steam tight casing provided with an inlet opening, a valve seat in the lower part of said casing provided with outlet openings, a valve in said valve seat, provided with a central opening and with openings which connect said central opening with the interior of said casing and also with openings which communicate with said central opening and in one position of the rotation of the valve register with the outlet openings in the valve seat, an expansion disk mounted in said casing, a plate on the lower side of said disk, an upward extension on said valve reaching to a point spaced apart from said plate, a coil spring mounted on said extension and engaging with said plate to hold said valve in said valve seat, yielding means whereby said valve is normally held open, means whereby vertical motion of said disk imparts rotary motion to said valve to bring said valve to position where the last mentioned openings therein register with the outlet openings in the valve seat.

Des Moines, Iowa, June 16, 1911.

GEORGE C. LA MOUNTAIN.

Witnesses:
R. W. SCOTT,
MAE E. JACOBS.